(12) United States Patent
Parés Montaner et al.

(10) Patent No.: US 7,735,693 B2
(45) Date of Patent: Jun. 15, 2010

(54) REDUCED-HEIGHT PRECOMPRESSION PUMP

(75) Inventors: Pere Parés Montaner, Esplugues de Llobregat (ES); Nuria Parés Fernández, legal representative, Vilanova i la Geltrú (ES); Victor Ribera Turró, Barcelona (ES); Haydee Martorell Pena, Sant Andrés de Llavaneras (ES)

(73) Assignee: MeadWestvaco Calmar S.A., Barcelona (ES)

( * ) Notice: Subject to any disclaimer, the term of this patent is extended or adjusted under 35 U.S.C. 154(b) by 1131 days.

(21) Appl. No.: 10/536,496

(22) PCT Filed: Nov. 25, 2002

(86) PCT No.: PCT/ES02/00556

§ 371 (c)(1),
(2), (4) Date: Feb. 10, 2006

(87) PCT Pub. No.: WO03/053591

PCT Pub. Date: Jul. 3, 2003

(65) Prior Publication Data

US 2006/0151541 A1 Jul. 13, 2006

(51) Int. Cl.
*B65D 88/54* (2006.01)
(52) U.S. Cl. .................. 222/321.2; 222/321.9
(58) Field of Classification Search .......... 222/321.2, 222/321.1, 321.3, 321.4, 321.5, 321.6, 321.7, 222/321.8, 321.9, 385
See application file for complete search history.

(56) References Cited

U.S. PATENT DOCUMENTS

| | | | | |
|---|---|---|---|---|
| 4,278,189 A * | 7/1981 | Kirk, Jr. | | 222/321.2 |
| 5,375,745 A | 12/1994 | Ritsche | | |
| 5,850,948 A | 12/1998 | Garcia et al. | | |
| 6,036,059 A | 3/2000 | VanBrocklin | | |
| 6,220,483 B1 * | 4/2001 | van der Heijden | | 222/136 |
| 6,286,726 B1 * | 9/2001 | Marelli | | 222/321.7 |
| 6,332,561 B1 * | 12/2001 | Garcia et al. | | 222/321.3 |
| 2001/0022309 A1 * | 9/2001 | Garcia et al. | | 222/385 |

FOREIGN PATENT DOCUMENTS

JP 2002-273278 9/2002
JP 2002-273279 9/2002

* cited by examiner

*Primary Examiner*—Kevin P Shaver
*Assistant Examiner*—Stephanie E Tyler

(57) ABSTRACT

Low height precompression pump. The pump includes: a cylinder (1) consisting of a pump chamber (3), and an inlet valve (5), a piston (7) with a lower outwardly flaring lip seal (9) and an inwardly flaring lip seal (19), which rims a central aperture (17) of the piston (7), a hollow pump plunger rod (21), which is in sliding engagement with the central aperture (17), and which has a passage for communication (23) between the pump chamber (3) and the exterior, a securement device (37), with an upper retention cover (39), which attaches the cylinder (1) to a container, a first elastic member (31) housed in the cylinder (1) and a second elastic member (47), which has an upper bearing point (49) applied directly on the plunger rod (21), and which is above the upper retention cover (39).

12 Claims, 11 Drawing Sheets

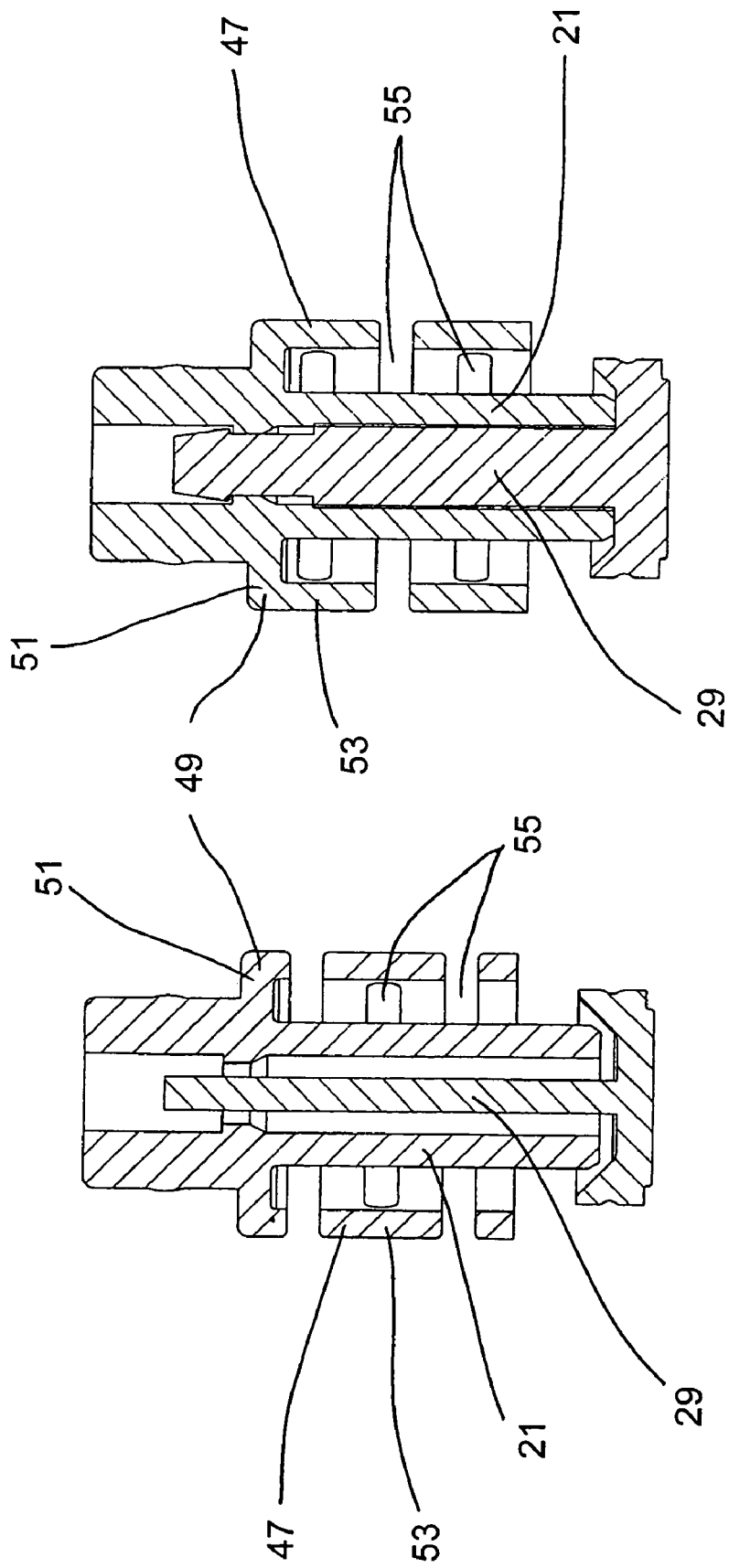

REDUCED-HEIGHT PRECOMPRESSION PUMP

FIELD OF THE INVENTION

This invention relates to a precompression pump which comprises:
- a cylinder which defines a pump body and in the interior of which there is a pump chamber,
- an inlet valve arranged at the bottom of the cylinder,
- a piston, the piston having a lower outwardly flaring lip seal, which lower outwardly flaring lip seal is suitable for sliding engagement with the interior of the cylinder, and an inwardly flaring lip seal which rims a central piston aperture,
- a plunger rod, suitable for sliding engagement with the central aperture, which plunger rod is hollow and has a communication passage in the interior thereof which is suitable for pump chamber communication with the exterior,
- an securement device suitable for securing the cylinder to a container, the securement device defining an upper retention cover,
- a first elastic member housed in the cylinder and a second elastic member.

Such precompression pumps allow precompression spraying of liquids contained in a container.

STATE OF THE ART

Precompression pumps are already known, employed for spraying all types of liquids, for example perfumery, cosmetics, cleaning, and pharmaceutical products etc.

In general the precompression device is a device which guarantees that the discharge of liquid to the outside takes place only when said liquid is already subject to a given minimum pressure in the interior of the pump chamber. In such manner one ensures the discharge of liquid at a greater pressure which, for example, allows improvement in the subsequent spraying thereof.

The art of spraying by means of precompression is known, and are known several precompression pumps which are suitable for performing spraying with precompression. For example the document EP 737,519 A2, which has been included hereto for reference, describes a spray pump with a precompression device. Similarly in documents U.S. Pat. Nos. 4,856,677, 4,941,595, and 5,234,135, which have been included hereto for reference are described other spray pumps which include precompression devices.

In general precompression pumps should be of a reduced size. This requirement is particularly important should such be used for cosmetics or perfumery products, since in such cases it is important to minimise the aesthetic impact of the pump mechanism. It is particularly important to reduce the height of the assembly. Logically, any design which allows manufacture of a low height precompression pump should always be compatible with requirements usual in this type of product, such as low production cost, low number of parts to assemble, high fidelity in spraying, etc.

SUMMARY OF THE INVENTION

The object of the present invention is to provide a low height precompression pump. In particular the object is to provide a pump similar to that described in EP 737,519, but with a lower height. Such aim is achieved by means of a precompression pump of the type indicated at the beginning hereof, characterised in that said second elastic member has an upper bearing point applied directly on said plunger rod, where said upper bearing point is above said upper retention cover.

In fact the second elastic member is responsible for the precompression force on the piston, its point of bearing being the rod. By allowing the upper bearing point to be above the upper retention cover, the height of the assembly can be reduced, since the space which is above the upper retention cover is utilised, said space usually remaining covered by a spray cap and in which normally only extends the pump plunger rod.

Preferably the piston is suitable for reciprocation between an upper position (or extended position) and a lower position (or depressed position), and has an upper outwardly flaring lip seal, arranged above the lower outwardly flaring lip seal, and the cylinder has a vent aperture located at a height such that it remains between the upper and lower outwardly flaring lip seals when the piston is in the upper position, and such that the interior of the container communicates with the atmosphere when the piston is in the lower position. In fact the precompression pump must have an air vent which allows the pumped liquid to be replaced by air in the interior of the container. For such venting there is preferably a lateral aperture between both outwardly flaring lip seals, such as mentioned previously. When the pump is in "inactive" position, which is to say with the plunger rod totally extended upwards, the vent aperture remains housed between both outwardly flaring lip seals. In such manner there is no fluid communication with the exterior, and thus the pump is sealed. When the plunger rod descends during a pumping movement there is a moment in which the upper outwardly flaring lip seal travels below the vent aperture. At such point the vent aperture allows the establishment of fluid communication between the interior of the container and the exterior, usually by means of free spaces provided in the proximity of the plunger rod.

Preferably the precompression pump has a retainer arranged together with the cylinder and the securement device, which retainer is suitable for being snapped to the cylinder such that the piston is retained in the interior of the cylinder by the retainer. In fact precompression pumps usually have a series of common members, generally standardised, which comprise the majority of the functional members of the pump, and which are housed in the interior of the cylinder, as for example the inlet valve, the piston, the plunger rod, the elastic members, etc. On the other hand they have members which differ with respect to each other in accordance with the actual application of the pump. Generally these members are the spray cap and the securement device. In this sense it might be advantageous that the manufacture process takes place in two phases: a first phase in which the common members are assembled and a second phase in which the pump is "personalised" adding the specific members for a given application. In order for this system of phase manufacture to be viable from a practical point of view, it is suitable that the assembly of common members is produced in such manner that they may be manipulated without the risk of disassembly. In this sense a retainer which can be snapped to the cylinder once the other members have already been introduced in such cylinder is advantageous. In this way the assembly may be manipulated without the sundry components unseating from the cylinder. Preferably the retainer serves as bearing point for the piston, such that the piston remains in contact with the retainer due to the force which the first elastic member exerts on said piston. In turn the piston retains the plunger rod, avoiding that the plunger rod unseats completely from the cylinder. The assembly as mounted can thus be manipulated and stored, such that the second phase of assembly can be realised in an independent manner, both in terms of time and place. As shall be seen below, in certain instances it might be advantageous to have a plunger rod that is composed of two parts: the plunger rod properly speaking and a plug that is joined to the lower end of the plunger rod. In such case it is possible that the piston retains the plunger rod by its engaging with the plug. It should be understood in such case then that the plug forms part of the plunger rod.

As previously noted, advantageously the retainer has a shoulder against which the piston bears when in the upper position (which is to say, the extended position). In a preferable embodiment of the invention, the height between the shoulder and the bottom of the cylinder determine the pump chamber volume. In this manner it is possible to have pumps of different pumping capacities by means of a change in one part only: the retainer.

Advantageously the second elastic member is of the same material as the plunger rod and is joined with the plunger rod in such manner that they form a single part. In this manner it is possible to eliminate one of the pump components from the assembly phase, since the second elastic member and the plunger rod form a single part. Usually this part is of plastics material and is habitually manufactured by injection. In this manner, apart from reducing the cost of producing the assembly the component manufacture cost can also be reduced, since the second elastic member and the plunger rod are obtained using a single manufacture process.

Alternatively the second elastic member may be of any other type, as for example a conventional helicoidal spring, of metallic material. Metallic helicoidal springs have, in their favour, a series of advantages which are already known but nevertheless important, as for example the preservation of elastic properties irrespective of length of use, the possibility of bringing to bear force which is significant when compared to size, the ease in modifying the force exerted by the spring by modifying the geometry of the spring, etc.

Preferably the plunger rod has an annular projection whose external edge is prolonged by means of a cylindrical surface parallel to the plunger rod, which cylindrical surface has slots such that allow the cylindrical surface to be compressed along the longitudinal axis in a reversible manner, in such manner that the cylindrical surface defines the second elastic member. The annular projection thus defines the upper bearing point of the second elastic member. The cylindrical surface is extended as from this annular projection in such manner that it forms a sheath or jacket for the plunger rod. Between the cylindrical surface and the plunger rod remains a hollow space which is large enough to ensure that the cylindrical surface can move with respect to the longitudinal axis without grazing the plunger rod. The opposite end of the cylindrical surface bears on the piston. The presence of slots in the cylindrical surface means that when the cylindrical surface is subject to compression along the longitudinal axis said cylindrical surface collapses reducing in longitude. This collapse is however reversible, due to the elastic properties of the plastics material used in the manufacture thereof. The cylindrical surface may thus exert a force along the longitudinal axis in a manner similar to that of a conventional helicoidal spring.

Preferably the slots are arranged in a plurality of planes perpendicular to the longitudinal axis, where between each pair of slots of a same plane there is a bond area comprised in the same plane, each bond area of a given plane being intercalated between two slots of the planes adjacent to the given plane. Advantageously in each of the perpendicular planes there are two slots. The slots are advantageously much larger than the bond areas so that in a plane perpendicular to the longitudinal axis which contains slots the larger part of the cylindrical surface is actually composed of slots, and there are only small stretches of material which form the bond areas. In the perpendicular plane adjacent to a given plane, the slots are staggered at a certain angle such that the bond area is face to face with a slot. In this manner when a compression force is exerted on the cylindrical surface the bond area displaces towards the slots which surround such and thus elastic deformation is generated.

BRIEF DESCRIPTION OF THE DRAWINGS

Other advantages and features of the invention will become apparent from the following description setting forth, in an entirely non limitative manner, some preferred embodiments of the invention with reference to the accompanying drawings, in which:

FIG. 8, is a view of a longitudinal section of a plunger rod according to the invention.

FIG. 9, is a view of a longitudinal section of the plunger rod of FIG. 8, rotated 90°.

DETAILED DESCRIPTION OF SOME EMBODIMENTS OF THE INVENTION

Figure 1:
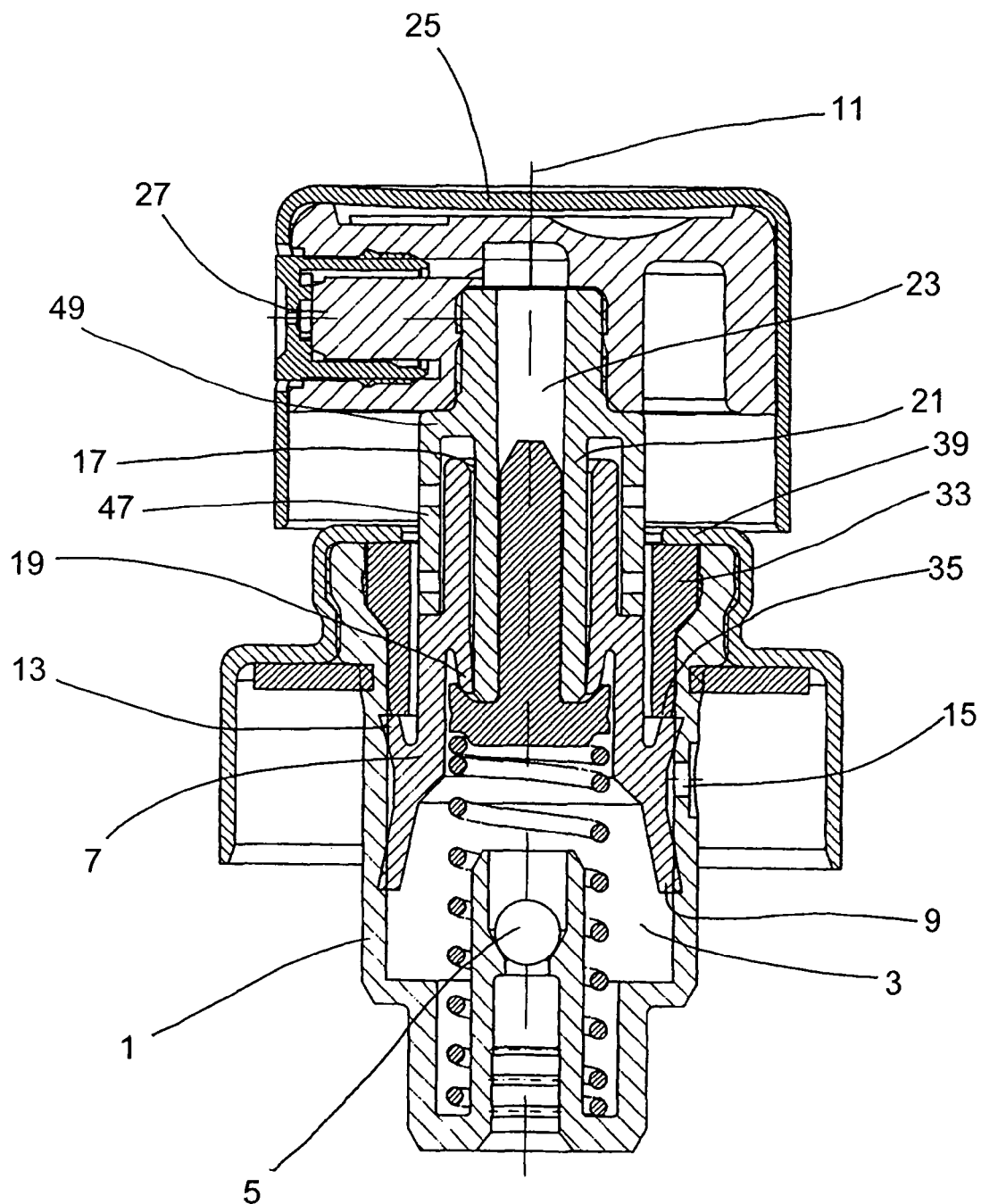
FIG. 1, is a view of a longitudinal section of a first embodiment of a precompression pump according to the invention, with the plunger rod completely extended.
Figure 2:
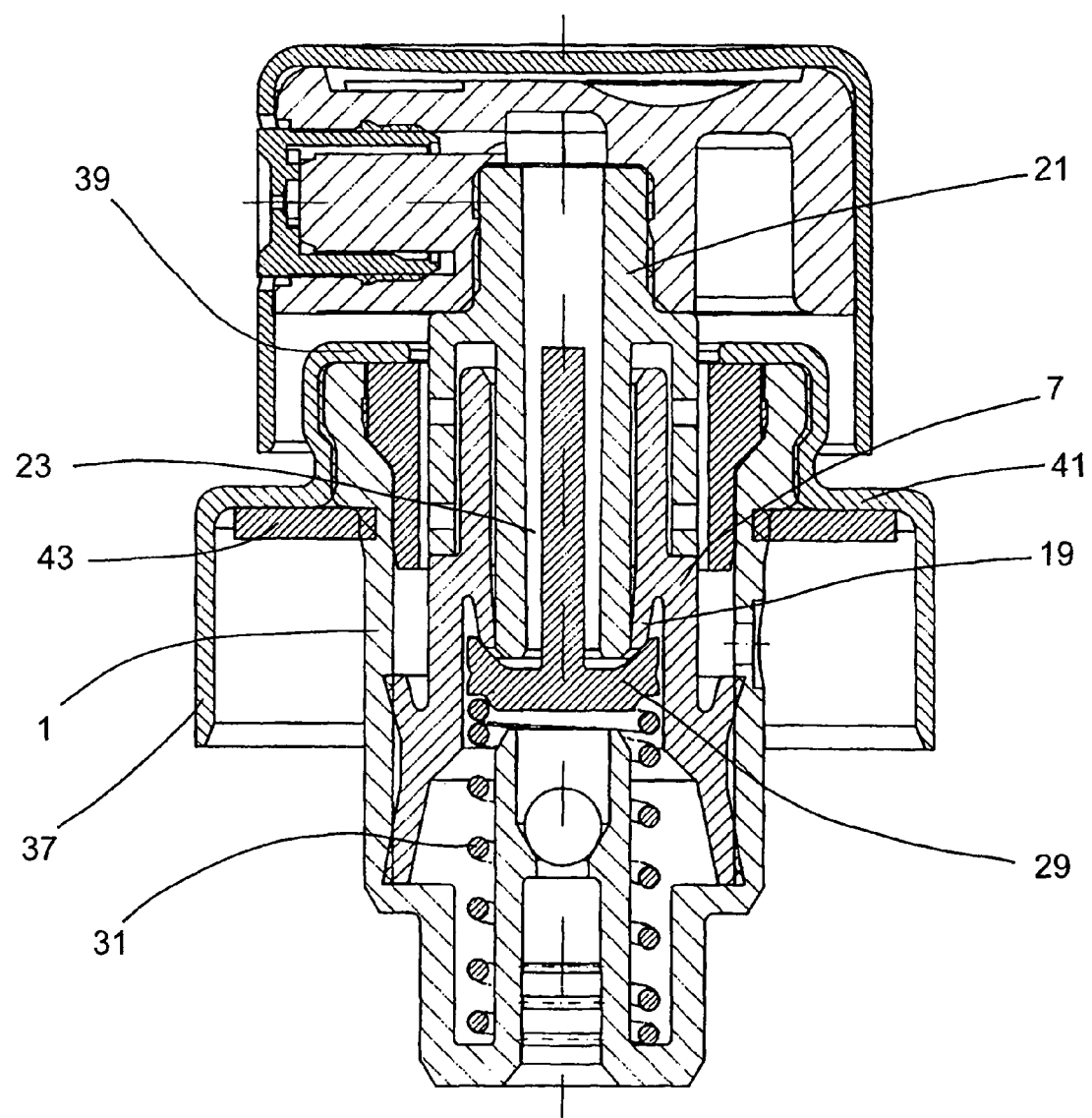
FIG. 2, is a view of a longitudinal section of the pump of FIG. 1, with the plunger rod partially depressed and rotated 90°.
Figure 3:
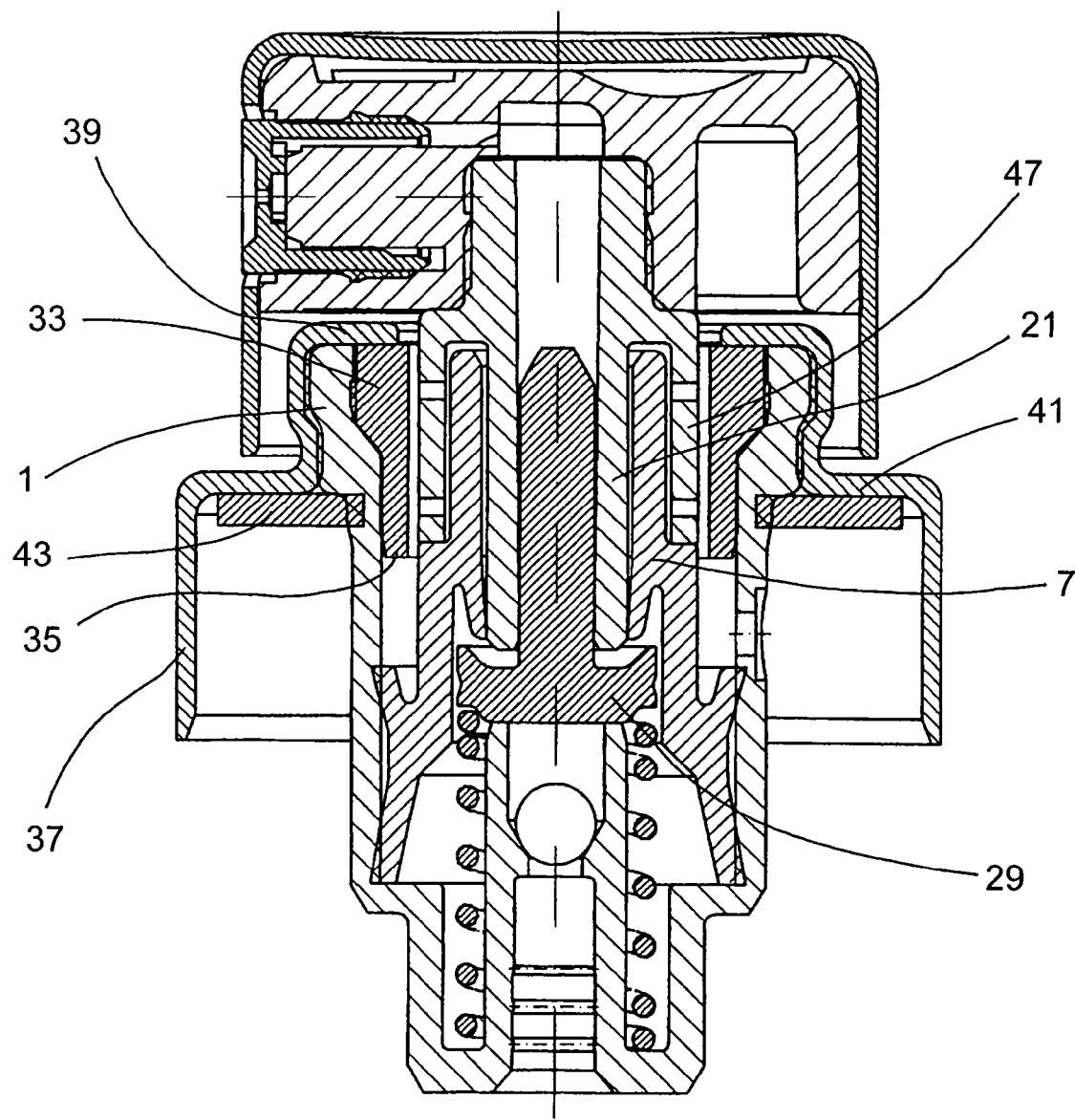
FIG. 3, is a view of a longitudinal section of the pump of FIG. 1, with the plunger rod totally depressed.

In FIGS. 1 to 3 is shown a first embodiment of a precompression pump according to the invention. The pump includes a cylinder 1 which defines a pump body. In the interior of the cylinder 1 is defined a pump chamber 3. The cylinder 1 has an inlet valve 5 arranged at the bottom of said cylinder 1. The upper end of the cylinder 1 is open. The inlet valve 5 may be of any known type as for example a ball check valve as illustrated in the Figures. The inlet valve 5 has a system for retaining the ball, to avoid said ball being unseated from its housing. Such retention systems are conventional and have not been illustrated in all of the Figures. An example of such may be observed in FIGS. 11 to 14.

The pump chamber 3 remains closed, with respect to its upper part, by a piston 7. Piston 7 has a lower outwardly flaring lip seal 9 which is in sliding engagement with the interior of the cylinder 1 when the piston 7 reciprocates along the longitudinal axis 11 defined by the cylinder 1. The piston 7 has a upper outwardly flaring lip seal 13, which is separated from the lower outwardly flaring lip seal 9 by a distance such that when the piston 7 is in its extended position there is a vent aperture 15 between both the outwardly flaring lip seals 9 and 13.

Piston 7 has a central aperture 17 and an inwardly flaring lip seal 19 which rims the central aperture 17. Through the central aperture 17 passes a pump plunger rod 21. The pump plunger rod 21 may travel along the longitudinal axis 11 lengthways in the central aperture 17. The plunger rod 21 is substantially a tube whose interior defines a communication passage 23 which is suitable for pump chamber 3 communication with the exterior, or more specifically with a cap 25 which includes a spray device 27. The plunger rod 21 defines in turn a longitudinal axis which is coincident with the longitudinal axis 11 defined by the cylinder 1. At the lower end of the plunger rod 21 is found a plug 29. This plug 29 may be mounted in the plunger rod 21 by different means, as for example by friction, by snapping, or by a combination of the two. In FIGS. 1 to 7 are represented some plugs 29 secured uniquely by friction, whilst in the FIGS. 8, 9 and 11-14 plugs 29 are represented which are secured by friction and which, at the same time, have a snap device. Logically it would be possible to realise other alternatives, such as for example, securing the plug 29 uniquely by snapping. The part of the plug 29 which is housed inside the plunger rod 21 is flattened, so as to not occupy all of the communication passage 23, thus allowing discharge of the pumped fluid. The projecting part of plug 29 has a shape approximately that of a cup with a diameter greater than the plunger rod 21. In this way the inwardly flaring lip seal 19 of piston 7 can abut against the cup and thus avoid that the plunger rod 21 unseats totally from the piston 7. Additionally the hermetic seal can thus be achieved between the piston 7 and the assembly formed by the plunger rod 21 and the plug 29, the communication passage 23 being shut.

A first helicoidal spring defines a first elastic member 31 which bears against, at one end, the bottom of the cylinder 1 whilst the other end bears against the cup of the plug 29. This first helicoidal spring biases the assembly formed by the plunger rod 21, the plug 29 and the piston 7 towards its extended position, in general outwards from the cylinder 1.

The upper end of the cylinder 1 is open. Through said upper end may be introduced in the cylinder 1 the sundry common components which form the precompression pump: the inlet ball check valve 5, the first helicoidal spring and the assembly formed by the plunger rod 21, the plug 29 and the piston 7. A retainer 33 is then introduced which is retained in the upper end of the cylinder 1, for example by means of a snapping mechanism. The retainer 33 has a shoulder 35 on which bears the piston 7, which is impelled outwards due to the force exerted by the first helicoidal spring. In this manner the unseating of the common components of the precompression pump is avoided and the assembly thus mounted can be handled and stored without problem.

In addition the retainer 33 allows the manufacture of precompression pumps having different pump capacities, in which all the members are common except said retainer 33. In fact by manufacturing a retainer 33 which has a shoulder 35 closer to the bottom of the cylinder 1 a precompression pump with a lesser pump capacity can be obtained, since piston 7, when in its upper extended position will define a lesser volume pump chamber 3 and correspondingly the quantity of pumped liquid will be less.

At the upper end of the plunger rod 21 a cap 25 is mounted which has a spray device 27. Both the cap 25 and the spray device 27 are independent of the present invention and may be of any design whatsoever.

Figure 4:
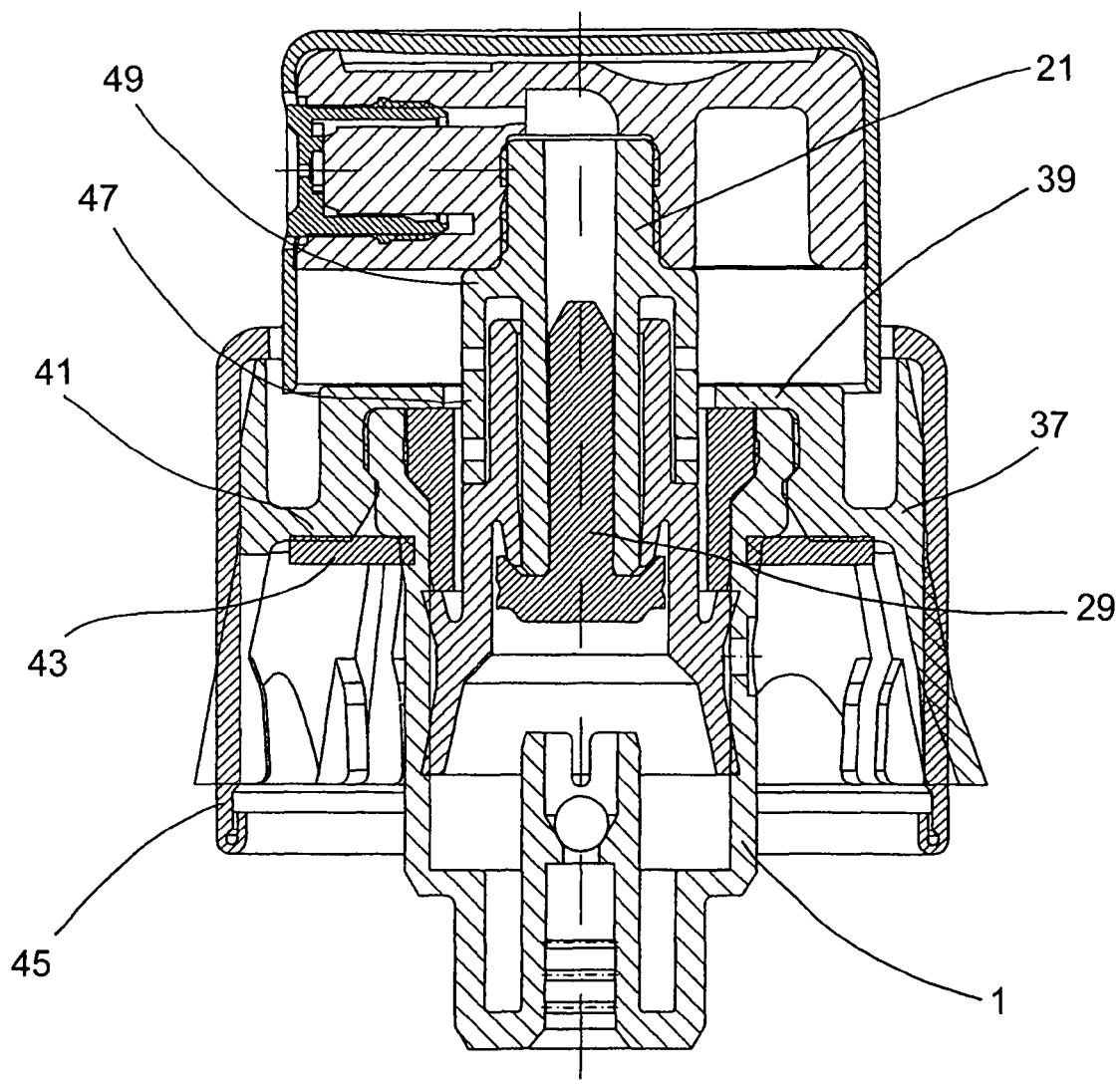
FIGS. 4, 5, and 6, are the equivalent of FIGS. 1, 2 and 3 with respect to a second embodiment of the precompression pump according to the invention.
Figure 5:
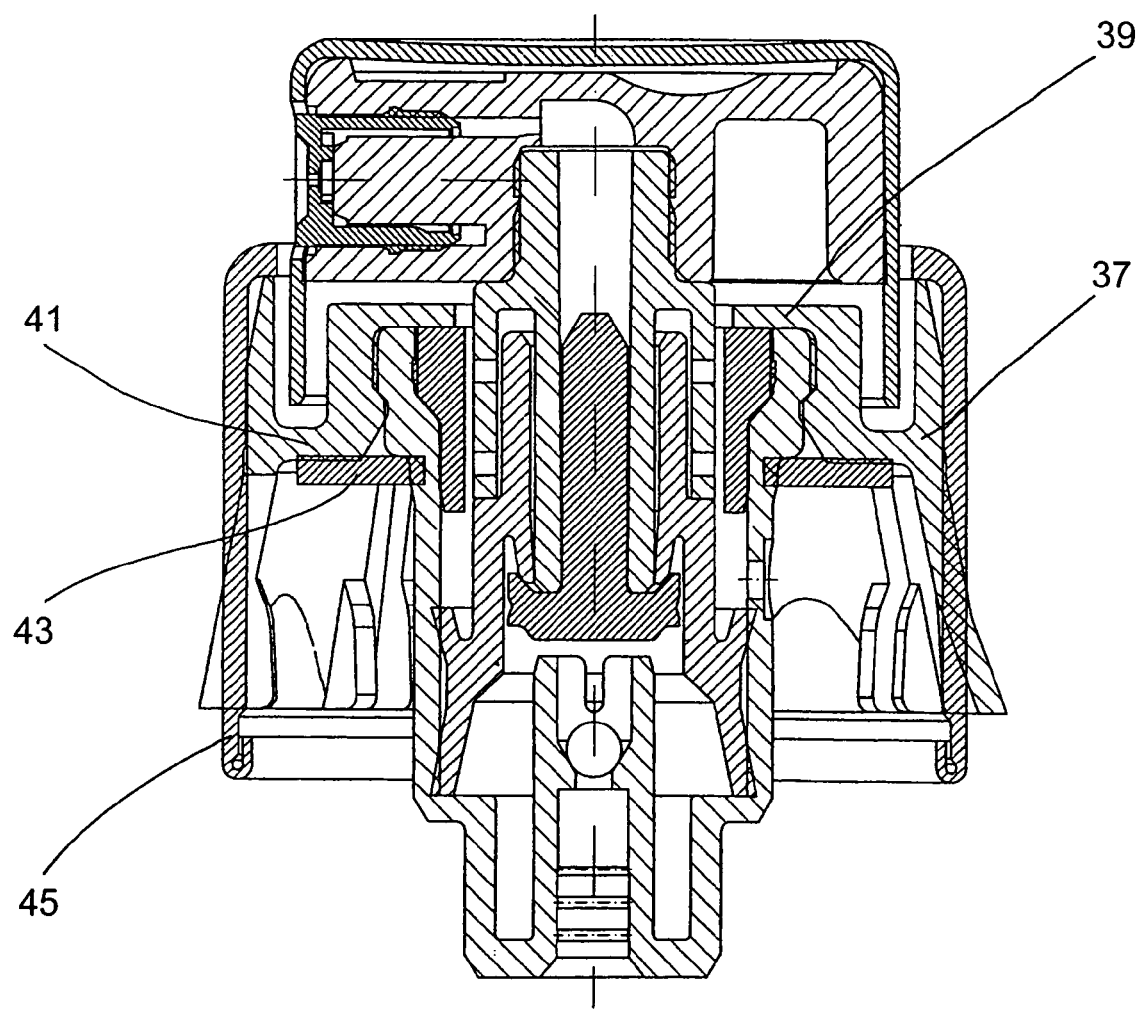
Figure 6:
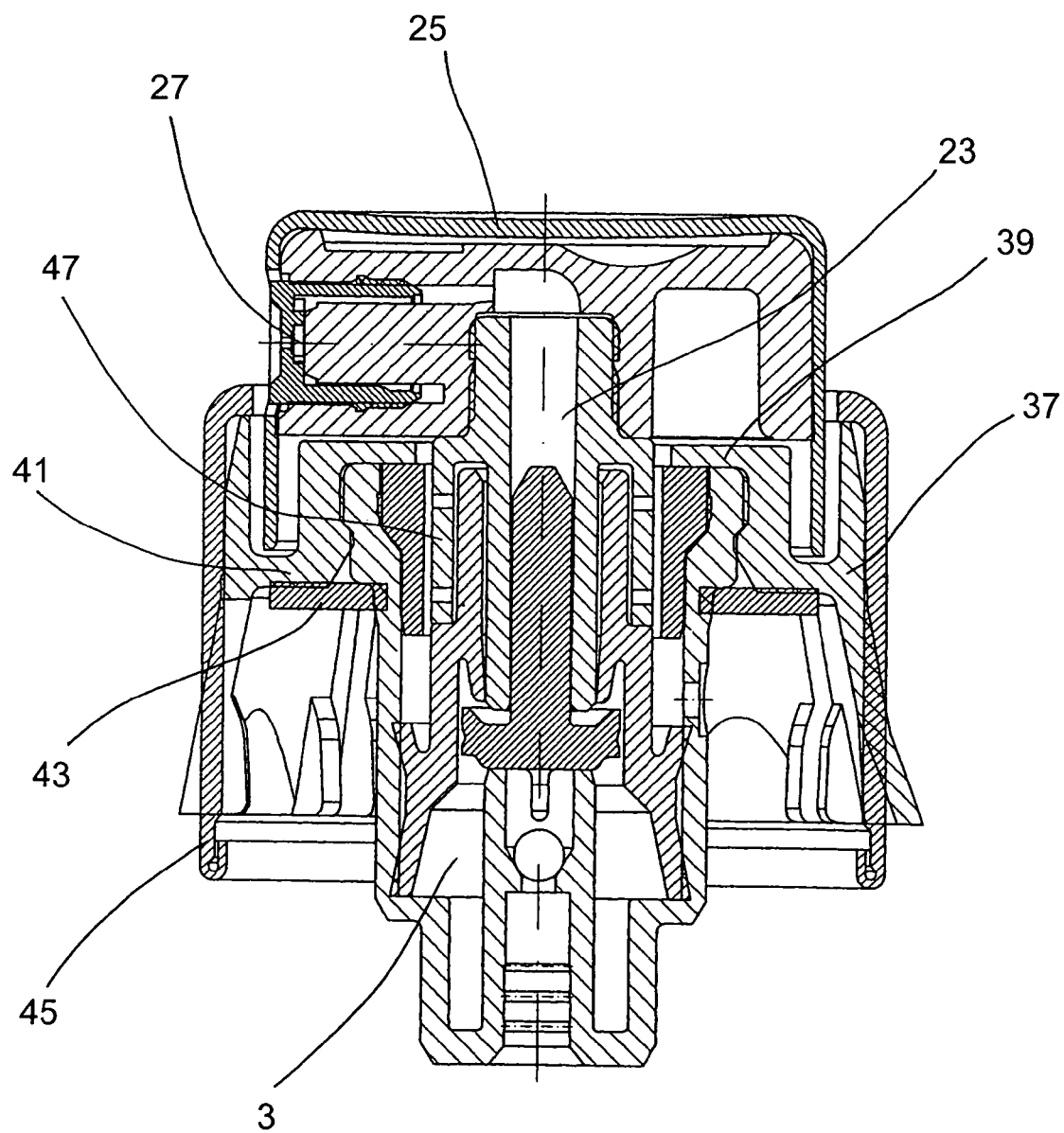

To secure the precompression pump to a container which contains the liquid to be pumped there is a securement device 37. Sundry securement devices 37 compatible with the present invention are possible. For example a metallic ferrule could be used, having an upper retention cover 39 which bears on the upper end of the cylinder 1, for example as represented in FIGS. 1-3, 7, and 11-14. Another possible securement device 37 is a device such as represented in FIGS. 4 to 6, and which is described in documents ES P9900578 and ES P200000557, which have been included herein as reference. This securement device 37 also has an upper retention cover 39 which bears on the upper end of the cylinder 1. The securement devices 37 also have a horizontal sealing surface 41 which is that which is applied on the upper edge of the container, possibly separated from said upper container edge by a watertight seal 43.

Should one of the securement devices 37 such as described in the documents ES P9900578 and ES P200000557 be used, it would be preferable to employ a capsule 45 such as described in document ES P200100471, which is included herein for reference.

To achieve the effect of precompression it is necessary that the liquid contained in the pump chamber 3 be discharged to the exterior only when a certain minimum pressure is reached. It is for such reason that a second elastic member 47 which forces the piston 7 towards the pump chamber 3 has been provided. In this manner the piston 7 increases the pressure exerted on the liquid contained in the pump chamber 3 and only when said liquid is subjected to a certain minimum pressure, is the resultant force capable of overcoming the force of the second elastic member 47, displacing the piston 7 upwards and allowing the liquid contained in the pump chamber 3 to be discharged into the communication passage 23 and from the communication passage 23 to the exterior via the cap 25 and the spray device 27.

Figure 7:
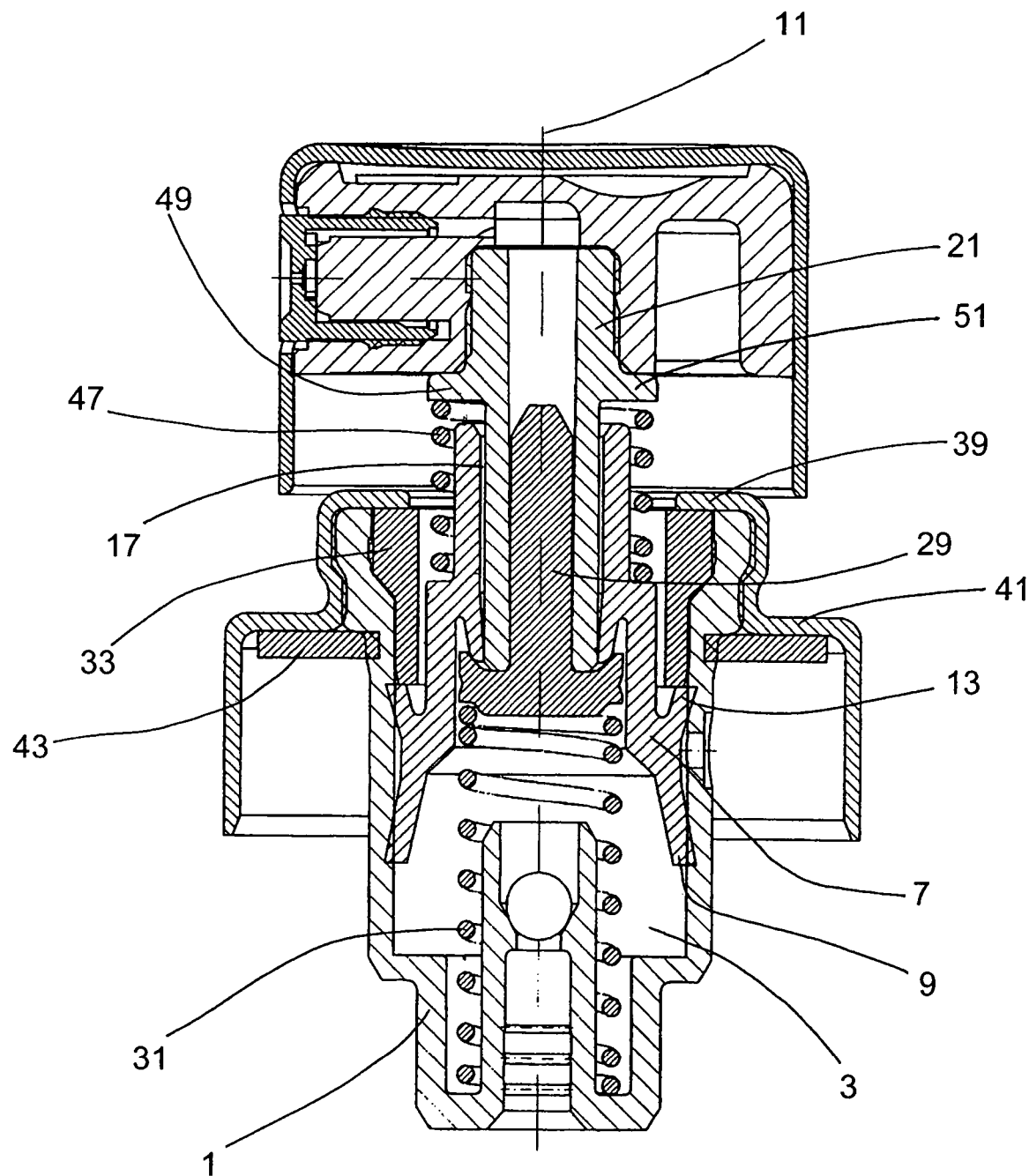
FIG. 7, is a view of a longitudinal section of a third embodiment of a precompression pump according to the invention, with the plunger rod totally extended.

The second elastic member 47 can be a conventional helicoidal spring, as represented in FIG. 7. The upper bearing point 49 of the second elastic member 47 is applied directly on the plunger rod 21 and is above the upper retention cover 39. In this manner the height of the assembly is reduced.

Figure 10:
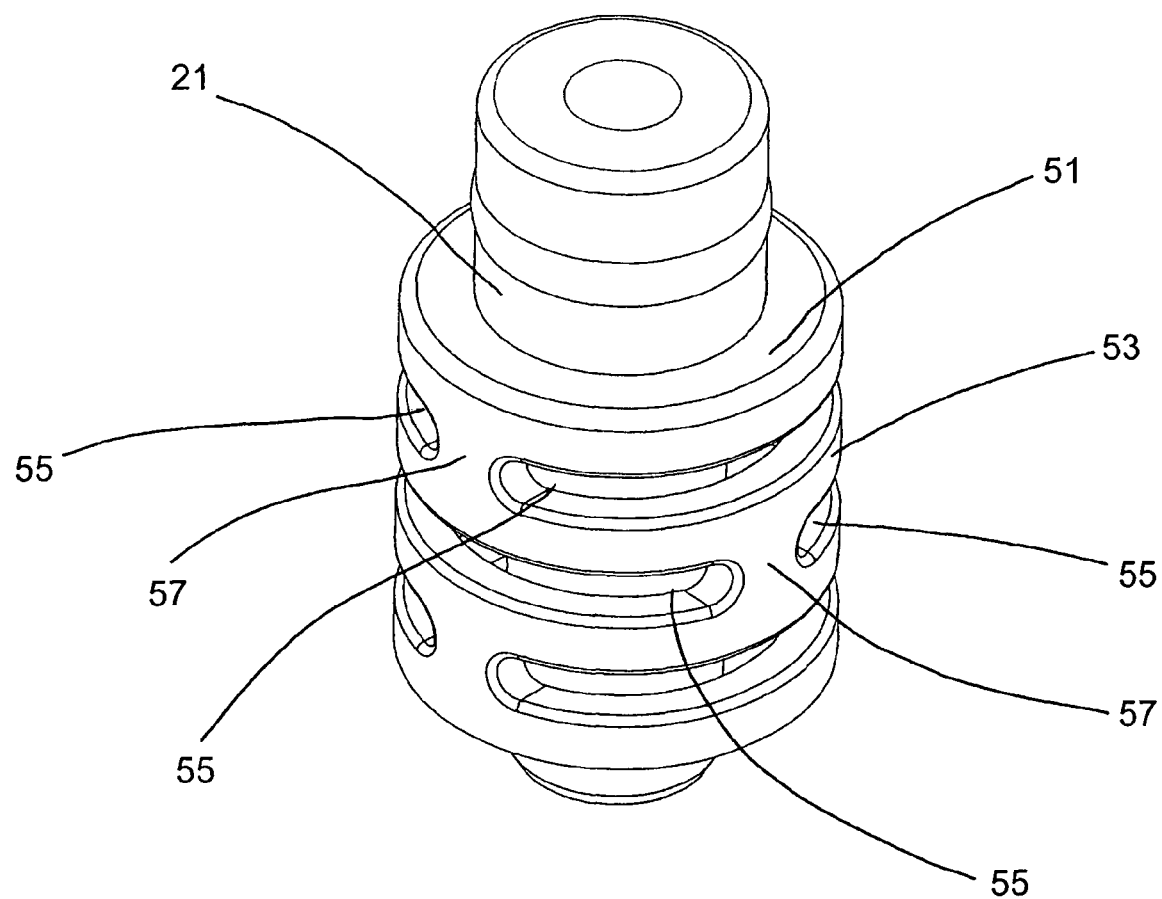
FIG. 10, is a perspective view of the plunger rod of FIG. 8.
Figures 11, 12:
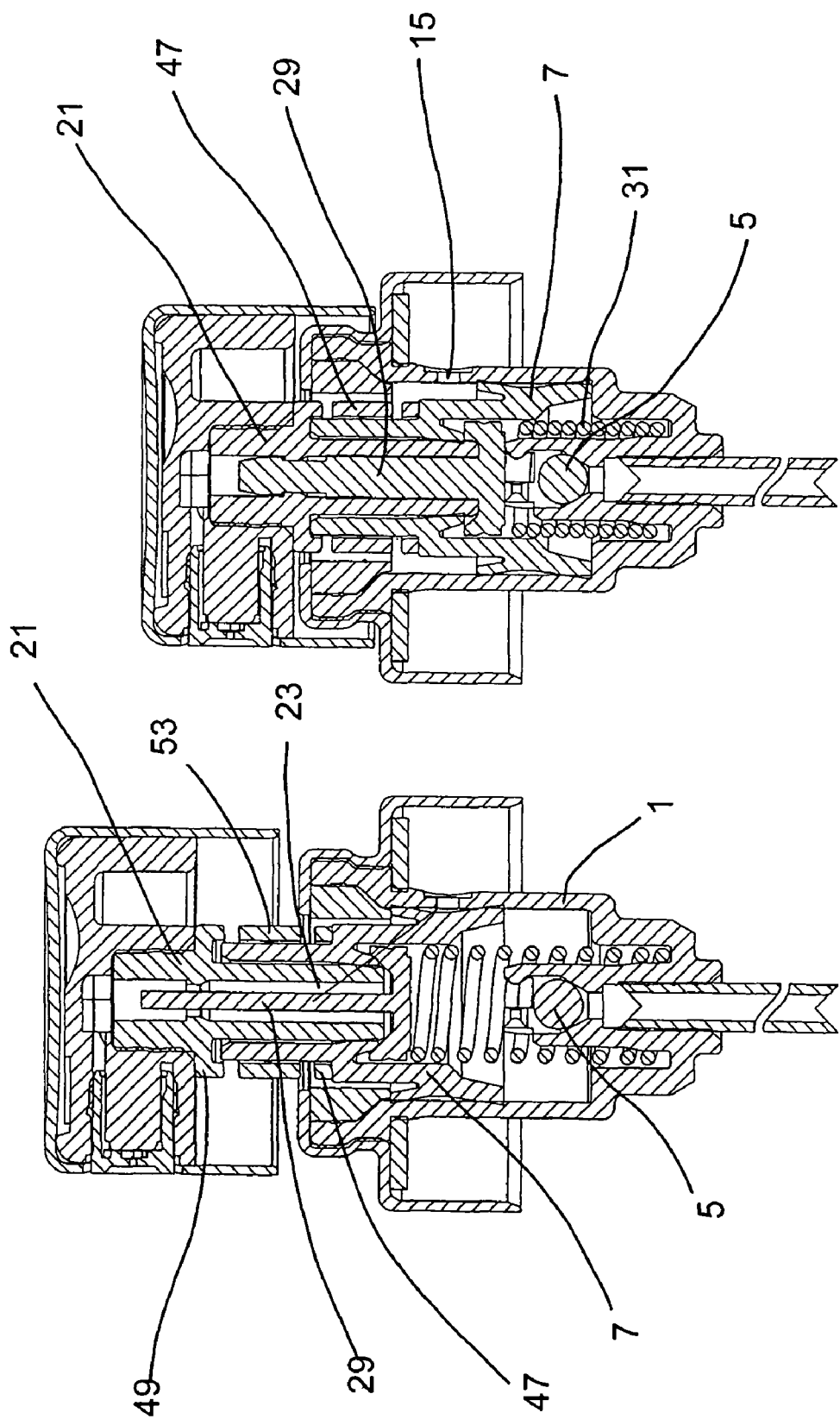
FIG. 11, is a view of a longitudinal section of a fourth embodiment of a precompression pump according to the invention, with the plunger rod of FIG. 8, totally extended.
FIG. 12, is a view of a longitudinal section of the pump of FIG. 11, with the plunger rod totally depressed and rotated 90°.
Figures 13, 14:
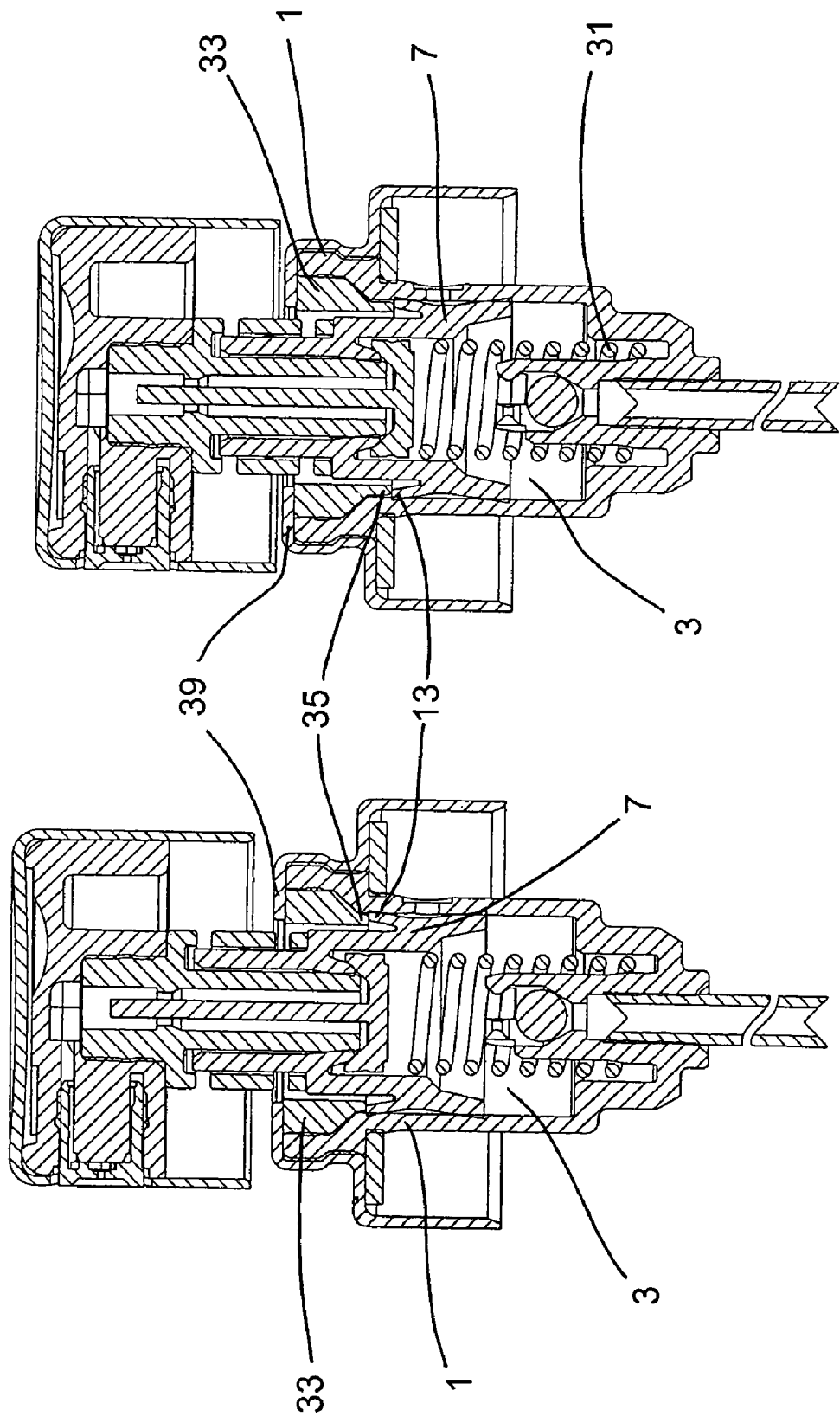
FIGS. 13 and 14, FIG. 13 corresponds entirely with FIG. 11, and is represented again in order to facilitate comparison with the pump of FIG. 14, which has a retainer of increased longitude.

Alternatively the second elastic member 47 is of the same material as the plunger rod 21 and is joined to the plunger rod 21 in such manner that they form a single part. The assembly may be obtained by plastics injection, such that only one physical part simultaneously performs the functions of plunger rod 21 and of the second elastic member 47. An example of this second elastic member 47 can be observed in FIGS. 1 to 6 and 11 to 14, and in better detail in FIGS. 8 to 10. In the above mentioned examples one may observe that the plunger rod 21 has an annular projection 51 whose outer edge is prolonged by means of a cylindrical surface 53 parallel to the plunger rod 21. The cylindrical surface 53 forms a type of sleeve or sheath around the plunger rod body 21. This cylindrical surface 53 has slots 55 paired with respect to each other and separated from each other by two bond areas 57. Each pair of slots 55 with the respective bond areas 57 thereof defines a "level" of the cylindrical surface 53. In the following "level" there are once again two slots 55 with two bond areas 57. Nevertheless the slots of the following level are staggered with respect to those of the preceding level such that the bond areas 57 of a given level remain intercalated between the slots 55 of the adjacent levels.

Advantageously the lower end of the second elastic member 47 bears directly on the piston 7. In this manner the force of the second elastic member 47 is transmitted directly to piston 7, which in fact should be the subject of the elastic force.

The operation of the precompression pump is the following. Beginning in an inactive position, in which the plunger rod 21 is in its upper or extended position, and which corresponds to FIGS. 1, 4, 7, 11 and 13, the plunger rod 21 begins to travel downwards. The liquid in the interior of the pump chamber 3 is subjected to pressure and as such the pressure increases rapidly. If the plunger rod 21 continues its descent, the piston 7 is then already subject to an upward force, due to the liquid subjected to pressure, which overcomes the force of the second elastic member 47, by which means the piston 7 (actually the inwardly flaring lip seal 19) ceases to bear against the cup (in its internal conical surface) of the plug 29 and allows the liquid to be discharged out to the communication passage 23. Once the force which depresses the plunger rod 21 ceases, the first elastic member 31 pushes the entire assembly upwards. The second elastic member 47 pushes the piston 7 towards the cup thus closing discharge to the communication passage 23. This provokes negative pressure in the pump chamber 3 which forces open the inlet valve 5.

Should the pump chamber 3 be filled with air, said air may be purged since the separation of the piston 7 from the cup may be forced mechanically at the end of the plunger rod 21 stroke (see FIGS. 2, 3 and 5, 6).

The invention claimed is:

1. Precompression pump comprising:
   a cylinder which defines a pump body and in whose interior there is a pump chamber,
   an inlet valve arranged at the bottom of said cylinder,
   a piston presenting a lower outwardly flaring lip seal for sliding engagement within said cylinder, and an inwardly flaring lip seal which rims a central aperture of said piston,
   a pump plunger rod for sliding engagement in said central aperture and which is hollow and has an interior communication passage for communicating said pump chamber with the outside,
   a securement device for attaching said cylinder to a container and defining an upper retention cover,
   a first elastic member housed in said cylinder and a second elastic member, said second elastic member defining a first height, measured according to a longitudinal axis of the pump,
   wherein said piston has an upper cylindrical wall partially surrounding an upper part of said pump plunger rod, said upper cylindrical wall guiding said upper part and defining a guiding height, measured according to the longitudinal axis,
   wherein said second elastic member has an upper bearing point directly applied on said plunger rod, in which said upper bearing point is above said upper retention cover, and in that said first height and said guiding height are at least partially overlapped.

2. Precompression pump according to claim 1, wherein:
   said piston is configured to reciprocate between an upper position and a lower position,
   said piston has an upper outwardly flaring lip seal, arranged above said lower outwardly flaring lip seal, and
   said cylinder has a vent aperture located at a height such that said vent aperture remains between said upper and lower outwardly flaring lip seals, when said piston is in the upper position, and such that the vent aperture is not between said upper and lower outwardly flaring lip seals when said piston is in said lower position.

3. Precompression pump according to claim 1, wherein said precompression pump has a retainer arranged together with said cylinder and said securement device, in which said retainer is attached by snapping to said cylinder such that said piston is retained by said retainer in the interior of said cylinder.

4. Precompression pump according to claim 3, wherein said piston is for reciprocating between an upper position and a lower position, and said retainer has a shoulder against which bears said piston when it is in said upper position, in which the height between said shoulder and said bottom of said cylinder determines the volume of said pump chamber.

5. Precompression pump according to claim 1, wherein said second elastic member is of a same material as said plunger rod and is joined to said plunger rod to form a single part.

6. Precompression pump according to claim 5, wherein said plunger rod has an annular projection whose outward edge extends by a cylindrical surface parallel to said plunger rod, said cylindrical surface having slots so as to allow said cylindrical surface to be compressed along a second longitudinal axis defined by said cylinder, in a reversible manner, such that said cylindrical surface defines said second elastic member.

7. Precompression pump according to claim 6, wherein said slots are arranged in a plurality of planes perpendicular to said second longitudinal axis, in which between each pair of slots of a same plane there is a bond area in the same plane, and in which each bond area of a given plane is intercalated between two slots of the planes adjacent to said given plane.

8. Precompression pump according to claim 7, wherein in each of said perpendicular planes there are two slots.

9. Precompression pump according to claim 2, wherein said precompresssion pump has a retainer arranged together with said cylinder and said securement device, in which said retainer is attached by snapping to said cylinder such that said piston is retained by said retainer in the interior of said cylinder.

10. Precompression pump according to claim 2, wherein said second elastic member is of a same material as said plunger rod and is joined to said plunger rod to form a single part.

11. Precompression pump according to claim 3, wherein said second elastic member is of a same material as said plunger rod and is joined to said plunger rod to form a single part.

12. Precompression pump according to claim 4, wherein said second elastic member is of a same material as said plunger rod and is joined to said plunger rod to form a single part.

* * * * *